(12) United States Patent
Hudson et al.

(10) Patent No.: US 7,271,941 B2
(45) Date of Patent: Sep. 18, 2007

(54) LASER SCANNING UNIT INCLUDING A SHIELD

(75) Inventors: Randall L. Hudson, Lexington, KY (US); Danny W. Peters, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 417 days.

(21) Appl. No.: 11/073,958

(22) Filed: Mar. 7, 2005

(65) Prior Publication Data

US 2006/0198403 A1    Sep. 7, 2006

(51) Int. Cl.
G02B 26/08    (2006.01)
(52) U.S. Cl. .................. 359/204; 359/205; 359/216
(58) Field of Classification Search ............. None
See application file for complete search history.

(56) References Cited

U.S. PATENT DOCUMENTS

| | | | |
|---|---|---|---|
| 4,796,963 | A | 1/1989 | Yoshimura |
| 5,726,699 | A | 3/1998 | Itami et al. |
| 5,901,000 | A | 5/1999 | Fish et al. |
| 6,285,482 | B1 | 9/2001 | Date |
| 6,501,586 | B1 * | 12/2002 | Takayama ............. 359/206 |
| 6,930,812 | B2 * | 8/2005 | Yamawaki ............. 359/204 |
| 2002/0018113 | A1 | 2/2002 | Koh et al. |
| 2004/0036939 | A1 | 2/2004 | Hama et al. |
| 2004/0109213 | A1 | 6/2004 | Takeuchi et al. |
| 2004/0119810 | A1 | 6/2004 | Cannon et al. |

* cited by examiner

Primary Examiner—James Phan
(74) Attorney, Agent, or Firm—Stevens & Showalter, L.L.

(57) ABSTRACT

A laser scanning unit is provided comprising: a housing; a scanning device; a first pre-scan assembly generating a first light beam and directing the first light beam toward the scanning device; a second pre-scan assembly generating a second light beam and directing the second light beam toward the scanning device; a first post-scan assembly receiving the first light beam reflected from the scanning device and causing a first portion of the first light beam to scan along a first scan path; and a second post-scan assembly receiving the second light beam reflected from the scanning device and causing a first portion of the second light beam to scan along a second scan path. The first post-scan assembly further reflects a second portion of the first light beam in a direction away from the first scan path. A shield is associated with the housing for blocking the second portion of the first light beam reflected by the first post-scan assembly during at least a portion of the scan of the first portion of the first light beam along the first scan path so as to prevent the second portion of the first light beam from entering the second post-scan assembly.

20 Claims, 10 Drawing Sheets

LASER SCANNING UNIT INCLUDING A SHIELD

TECHNICAL FIELD AND INDUSTRIAL APPLICABILITY OF THE INVENTION

The present invention relates generally to a laser scanning unit, and more particularly, to such a unit having a shield for blocking at least a portion of laser light energy reflected by a post-scan assembly.

BACKGROUND OF THE INVENTION

Laser scanning units are known comprising a laser diode for generating a laser beam, a rotating polygonal mirror for reflecting the laser beam along a scan line on a photoconductive (PC) drum, and post scan optics comprising at least one fΘ lens positioned between the rotating mirror and the PC drum. Ghosting light may be generated by reflection of the laser beam at a surface of a lens forming part of the post-scan optics. The ghosting light may be re-reflected off the polygonal mirror toward the PC drum, thereby causing print defects. A shield covering at least a portion of the polygonal mirror is provided so as to block the ghosting light.

U.S. Pat. No. 5,901,000 discloses a shroud provided about a rotatable polygonal mirror. The shroud forms part of a cover, which also includes a rib functioning to cancel noise generated during rotation of the mirror.

There is a need for reducing or blocking ghosting light generated in a laser scanner unit having a single polygonal mirror reflecting a plurality of laser beams impinging upon the mirror and further including opposing post-scan optical assemblies.

SUMMARY OF THE INVENTION

This need is met by the present invention, wherein a shield is provided for reducing or blocking ghosting light generated in a laser scanner unit having a single polygonal mirror reflecting a plurality of laser beams impinging upon the mirror and further including opposing post-scan optical assemblies. The shield functions to block ghosting light reflected from a first post-scan optical assembly toward an opposing, second post-scan optical assembly and from the second post-scan optical assembly toward the first post-scan optical assembly.

In accordance with a first aspect of the present invention, a laser scanning unit is provided comprising: a housing; a scanning device; a first pre-scan assembly generating a first light beam and directing the first light beam toward the scanning device; a second pre-scan assembly generating a second light beam and directing the second light beam toward the scanning device; a first post-scan assembly receiving the first light beam reflected from the scanning device and causing a first portion of the first light beam to scan along a first scan path; and a second post-scan assembly receiving the second light beam reflected from the scanning device and causing a first portion of the second light beam to scan along a second scan path. The first post-scan assembly further reflects a second portion of the first light beam in a direction away from the first scan path. A shield is associated with the housing for blocking the second portion of the first light beam reflected by the first post-scan assembly during at least a portion of the scan of the first portion of the first light beam along the first scan path so as to prevent the second portion of the first light beam from entering the second post-scan assembly during the scan portion.

The shield may comprise a main body fitted over the scanning device, wherein the main body may include at least one leg portion. It is also contemplated that the shield may comprise at least two leg portions.

The main body may comprise a first slot through which the first beam passes and a second slot through which the second beam passes.

The main body may have a substantially smooth interior surface so as to reduce turbulent air noise.

The scanning device may comprise a rotating polygonal mirror having at least one facet. In a first embodiment, the first pre-scan assembly directs the first light beam toward the at least one facet at a substantially right angle. In a second embodiment, the first pre-scan assembly directs the first light beam toward the at least one facet at an oblique angle.

The first and second pre-scan lens assemblies may be separated from one another by an angle of about 60 degrees.

In accordance with a second aspect of the present invention, a laser scanning unit is provided comprising: a housing; a rotating polygonal mirror having a center axis and a plurality of facets; a pre-scan assembly generating first and second light beams and directing the first and second light beams toward a common facet on the polygonal mirror such that each of the first and second light beams strikes the common facet at an oblique angle. The beams are reflected by the common facet and cross one another at points spaced radially from the polygonal mirror center axis. The laser scanning unit further comprises first and second post-scan assemblies and a shield. The first post-scan assembly receives the reflected first beam and causes a first portion of the first beam to scan along a first scan path. The first post-scan assembly further reflects a second portion of the first beam in a direction away from the first scan path. The second post-scan assembly receives the reflected second beam and causes a first portion of the second beam to scan along a second scan path. The shield is associated with the housing for blocking the second portion of the first beam reflected by the first post-scan assembly during at least a portion of the scan of the first portion of the first light beam along the first scan path. The shield has a main body provided with a side wall including a slot through which the first and second beams pass prior to and after striking the common facet. The main body side wall is located so as to be substantially near at least one of the crossing points of the first and second beams.

The first and second beams may strike the common facet at oblique angles in a plane substantially perpendicular to a rotational plane of the polygonal mirror.

The main body side wall may be located between a crossing point nearest to the polygonal mirror center axis and a crossing point furthest from the polygonal mirror center axis.

In accordance with a third aspect of the present invention, a laser scanning unit is provided comprising: a housing; a scanning device; a first pre-scan assembly generating first and second light beams and directing the first and second light beams toward the scanning device; a second pre-scan assembly generating third and fourth light beams and directing the third and fourth light beams toward the scanning device; a first post-scan assembly receiving the first and second beams reflected from the scanning device and causing a first portion of the first beam to scan along a first scan path and a first portion of the second beam to scan along a second scan path; and a second post-scan assembly receiving the third and fourth beams reflected from the scanning device and causing a first portion of the third beam to scan along a third scan path and a first portion of the fourth beam to scan along a fourth scan path. The first post-scan assembly further reflects a second portion of the first beam in a direction away from the first scan path. The second post-scan assembly further reflects a second portion of the third beam in a direction away from the third scan path. A shield is associated with the housing for blocking the second portion of the first beam reflected by the first post-scan assembly during at least a portion of the scan of the first portion of the first light beam along the first scan path and further blocks the second portion of the third beam reflected by the second post-scan assembly during at least a portion of the scan of the first portion of the third light beam along the third scan path.

The main body may comprise a first slot through which the first and second beams pass and a second slot through which the third and fourth beams pass.

The scanning device may comprise a rotating polygonal mirror having at least one facet. The first pre-scan assembly may direct each of the first and second light beams toward the at least one facet at an oblique angle.

The first and second pre-scan lens assemblies may be separated from one another by an angle of about 60 degrees.

The first and second post-scan assemblies may be symmetrically positioned about the scanning device.

DETAILED DESCRIPTION OF THE PREFERRED EMBODIMENTS

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
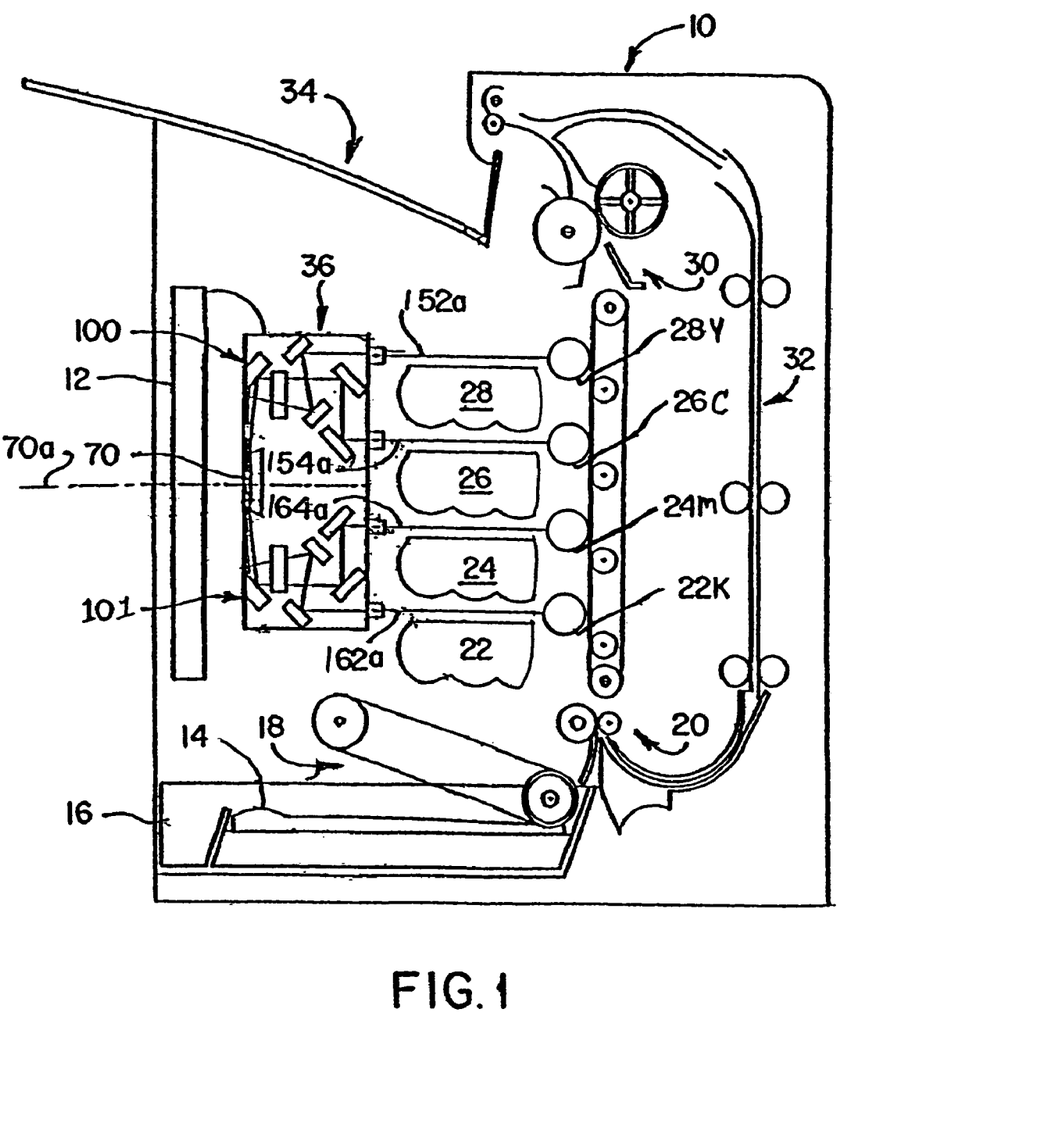
FIG. 1 is a schematic illustration of an electrophotographic image forming apparatus including a printhead constructed in accordance with a first embodiment of the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24M that delivers magenta toner to the sheet 14 in a pattern corresponding to a magenta image plane of the image being printed. The image forming station 26 includes a photoconductive drum 26C that delivers cyan toner to the sheet 14 in a pattern corresponding to a cyan image plane of the image being printed. The image forming station 28 includes a photoconductive drum 28Y that delivers yellow toner to the sheet 14 in a pattern corresponding to a yellow image plane of the image being printed.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

To effect the imaging operation, the controller 12 manipulates and converts data defining each of the KMCY image planes into separate corresponding laser pulse video signals, and the video signals are then communicated to a printhead 36 (also referred to herein as a "laser scanning unit"). The printhead 36 comprises a printhead housing 37, see FIG. 2, which is preferably formed as a molded component. The printhead 36 further includes a single rotatable polygonal mirror 70 and first and second pre-scan optical assemblies 50 and 60. The pre-scan assemblies 50 and 60 are spaced apart from one another by an angle of approximately 60 degrees, see FIG. 2. The mirror 70 is supported for rotation about a rotational axis 70a, driven by an appropriate motor and comprises a plurality of facets 72, see FIGS. 1-4. It is contemplated that the polygonal mirror 70 may be replaced by another scanning device, such as a galvanometric scanning device, one of which is disclosed in U.S. Published Patent Application US 2004/0119810 A1, the disclosure of which is incorporated by reference herein.

Figure 2:
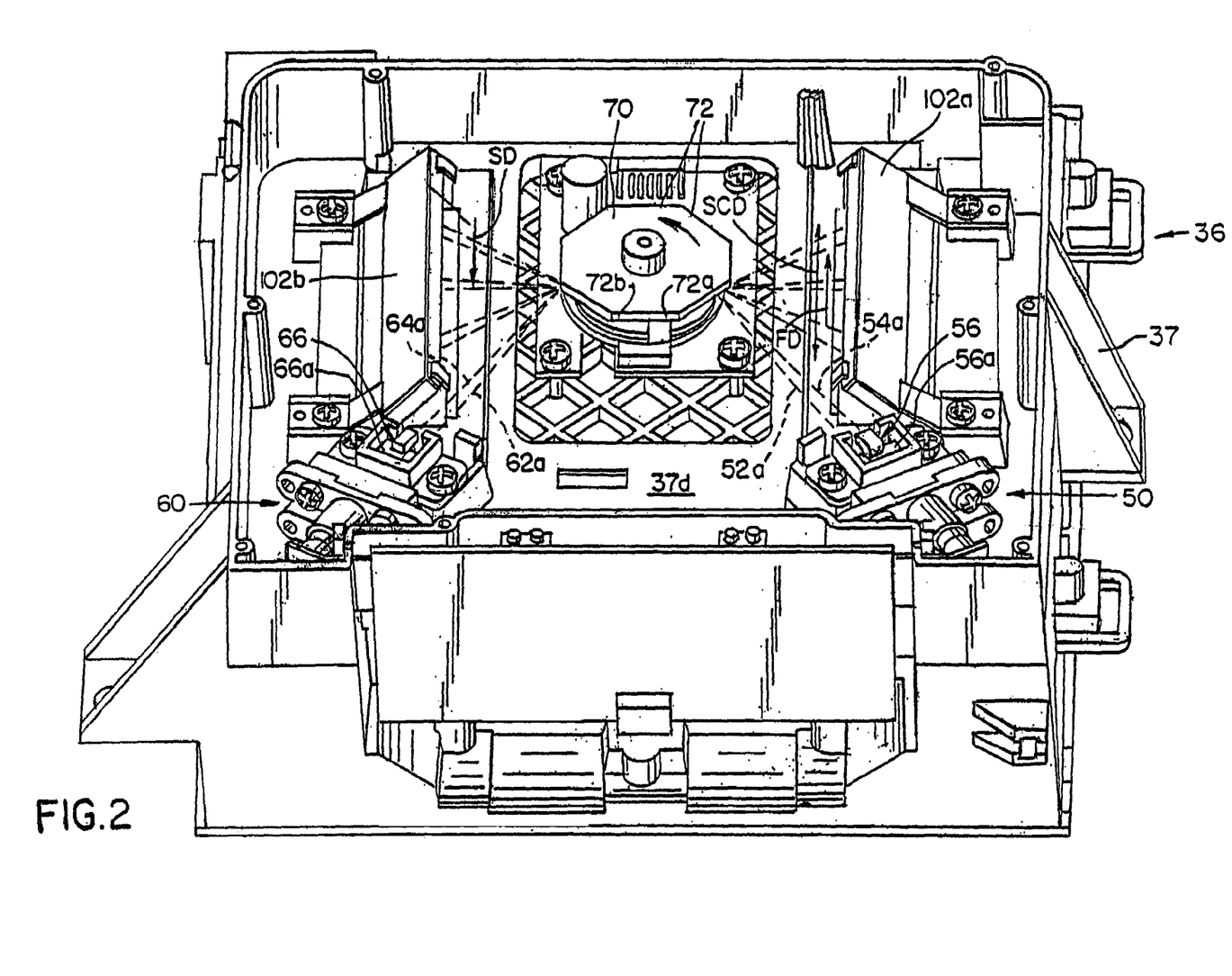
FIG. 2 is a perspective view of the printhead constructed in accordance with the first embodiment of the present invention without a shield.
Figure 3:
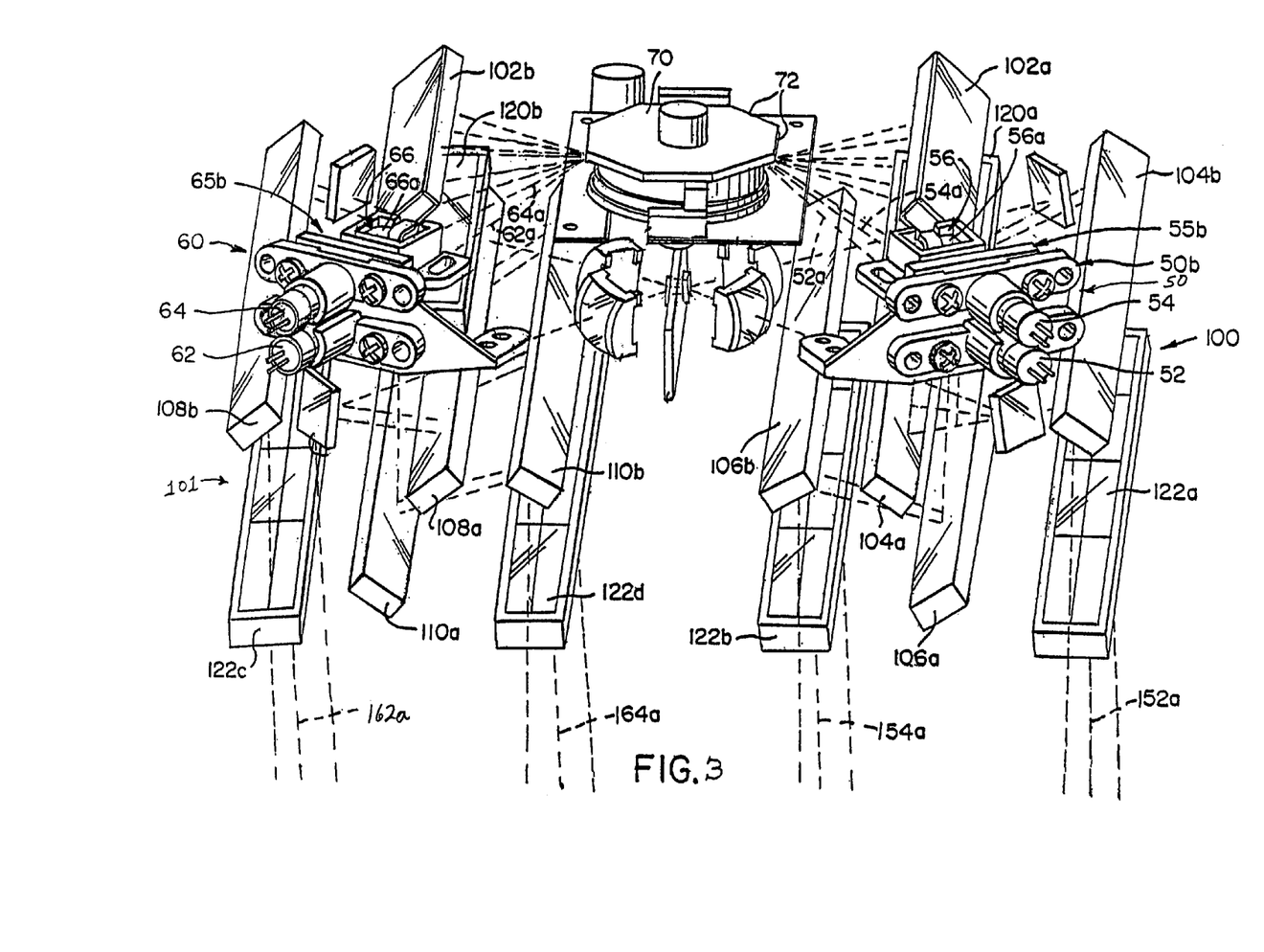
FIGS. 3 and 4 are perspective views of the polygonal mirror, the first and second pre-scan assemblies and the first and second post-scan optical assemblies with the printhead housing and shield removed.

The first pre-scan assembly 50 comprises first and second laser diodes 52 and 54, see FIG. 3, each of which generates a corresponding laser beam 52a and 54a, see also FIG. 2. The first assembly 50 additionally includes first and second collimation assemblies (only the second assembly 55b is shown in FIG. 3; the first collimation assembly is located directly below the second assembly 55b) for receiving respectively the first and second beams 52a and 54a. Each collimation assembly comprises a collimation lens (not shown) for collimating its corresponding laser beam 52a, 54a. Further provided is a first pre-scan lens assembly 56 comprising a single pre-scan lens 56a for receiving the first and second collimated beams 52a and 54a. The pre-scan lens 56a functions to redirect the beams 52a and 54a such that they converge at or near a common spot or location on a common polygonal mirror facet, see FIGS. 2-4. The pre-scan lens 56a further functions to focus or converge each beam 52a and 54a in a process direction, which is generally parallel to the rotational axis 70a of the mirror 70, without causing convergence of the beam in a scan direction. The scan direction is indicated by arrow SCD in FIG. 2, and is substantially orthogonal to the rotational axis of the mirror 70.

Figure 4:
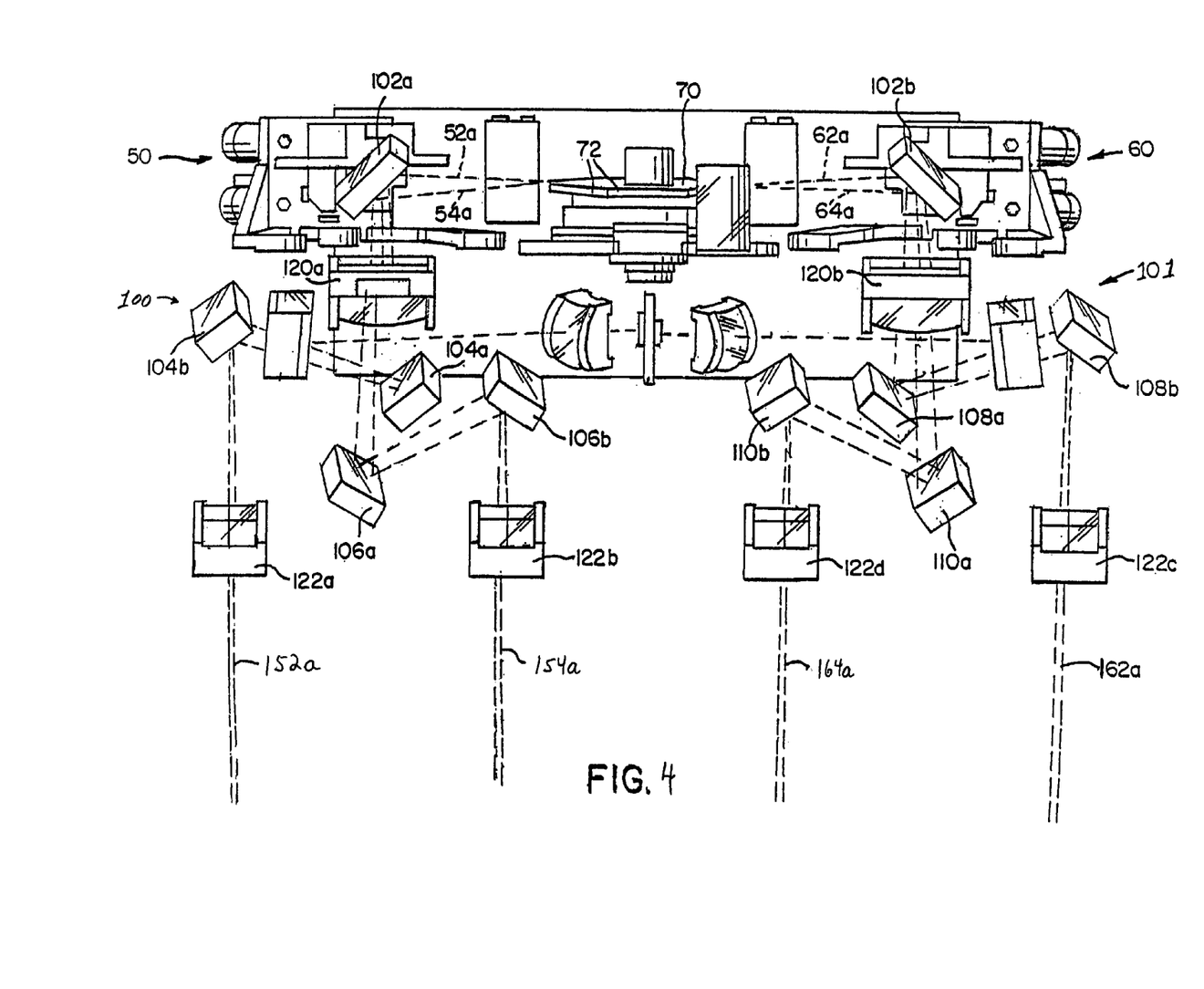

The first and second beams 52a and 54a are positioned in the same plane, which plane is substantially parallel to the rotational axis 70a of the mirror 70 and perpendicular to a rotational plane of the polygonal mirror, see FIGS. 2-4. In addition, the first and second beams 52a and 54a are positioned on opposing sides of the rotational mirror plane at an angle of about 3 degrees to the plane such that an angle of six degrees is defined between the two beams 52a, 54a. Hence, the first and second beams 52a and 54a strike a common facet at oblique angles in the plane substantially perpendicular to the rotational plane of the mirror 70.

The second pre-scan assembly 60 comprises third and fourth laser diodes 62 and 64, each of which generates a corresponding laser beam 62a and 64a, see FIG. 3. The second assembly 60 also includes third and fourth collimation assemblies (only the fourth assembly 65b is illustrated in FIG. 3; the third assembly is located directly below the fourth assembly 65b) for receiving respectively the third and fourth laser beams 62a and 64a. Each collimation assembly comprises a collimation lens (not shown) for collimating the third and fourth beams 62a and 64a. Further provided is a second pre-scan lens assembly 66 comprising a single pre-scan lens 66a for receiving the third and fourth collimated beams 62a and 64a. The pre-scan lens 66a functions to redirect the beams 62a and 64a such that they converge at or near a common spot or location on a common polygon facet, see FIG. 2. The pre-scan lens 66a further functions to focus or converge each beam 62a and 64a in the process direction, without causing convergence of the beam in the scan direction.

The third and fourth beams 62a and 64a are positioned in the same plane, which plane is substantially parallel to the rotational axis 70a of the mirror 70 and perpendicular to the rotational plane of the rotating polygonal mirror 70. In addition, the third and fourth beams 62a and 64a are positioned on opposing sides of the rotational mirror plane at an angle of about 3 degrees to the plane such that an angle of six degrees is defined between the two beams 62a, 64a. Hence, the third and fourth beams 62a and 64a strike a common facet at oblique angles in a plane substantially perpendicular to the rotational plane of the mirror 70.

Each of the laser beams 52a, 54a, 62a, 64a is modulated so as to write pixels or Pels according to an associated one of the video signals from the controller 12 as the beam scans along a corresponding scan path. In particular, the first laser beam 52a is modulated according to a video signal corresponding to the yellow image plane. The second laser beam 54a is modulated according to a video signal corresponding to the cyan image plane. The third laser beam 62a is modulated according to a video signal corresponding to the black image plane. The fourth laser beam 64a is modulated according to a video signal corresponding to the magenta image plane.

Each laser beam 52a, 54a, 62a, 64a is reflected off the rotating polygonal mirror 70 and is directed towards a corresponding one of the photoconductive drums 28Y, 26C, 22K, 24M by select mirrors and lenses in first and second post-scan optical assemblies 100 and 101, see FIGS. 3 and 4. More specifically, the first and second beams 52a, 54a pass through the first post-scan optical assembly 100, while the third and fourth beams 62a and 64a pass through the second post-scan optical assembly 101. The first and second post-scan optical assemblies 100 and 101 are symmetrically positioned about the polygonal mirror rotational axis 70a.

The first and second beams 52a, 54a, after being reflected off the rotating polygonal mirror 70, are reflected by a reflection mirror 102a and pass through a first F-1 lens 120a, see FIGS. 3 and 4. The F-1 lens 120a functions to focus or converge each beam 52a, 54a to a point in the scan direction. The lens 120a may also function to effect a slight reduction in laser beam velocity variation in the scan direction.

A first portion 152a, i.e., a substantial portion, of the first beam 52a and a first portion 154a, i.e., a substantial portion, of the second beam 54a pass through the F-1 lens 120a. However, a second portion 252a, i.e., a small portion, of the first beam 52a and a second portion 254a, i.e., a small portion, of the second beam 54a may be reflected by a beam entrance surface or a beam exit surface of the F-1 lens 120a in a direction away from the PC drums 28Y and 26C, see FIG. 5 where the second portion 252a of the first beam 52a is shown reflected back towards the mirror 70 and FIG. 7.

Figure 5:
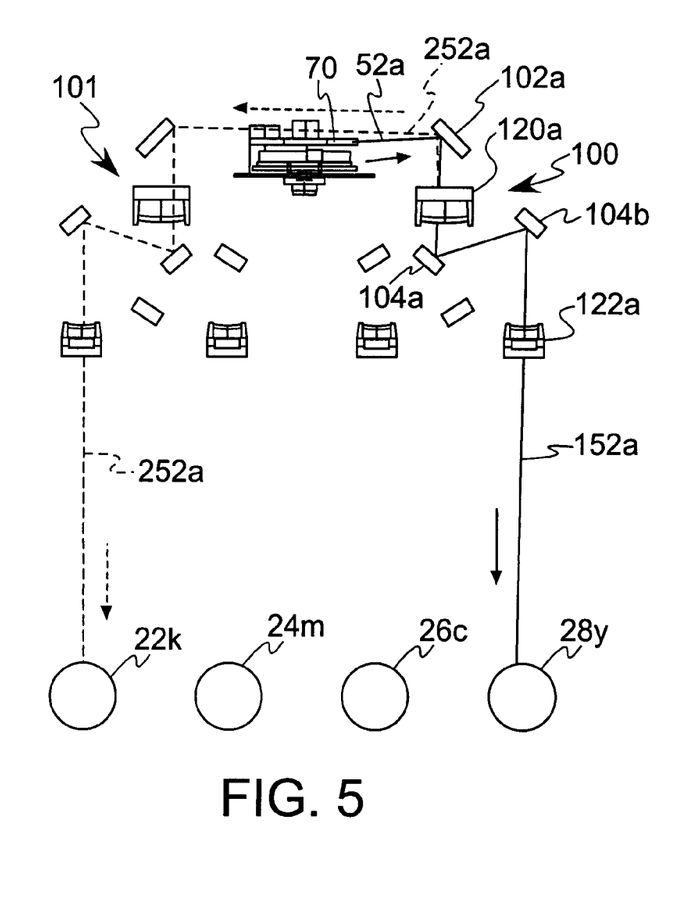
FIG. 5 is a view of the polygonal mirror and the first and second post-scan optical assemblies and illustrating a second portion of a first beam being reflected so as to pass over the polygonal mirror and into the second post-scan optical assembly.

After passing through the first F-1 lens 120a, the first portion 152a of the first beam 52a is reflected by first beam mirrors 104a and 104b prior to passing through a corresponding first F-2 lens 122a, see FIGS. 3-5. The first portion 154a of the second beam 54a, after passing through the first F-1 lens 120a, is reflected by second beam mirrors 106a and 106b prior to passing through a corresponding second F-2 lens 122b. The first and second F-2 lenses 122a and 122b function to complete the convergence of their corresponding beam first portions 152a, 154a along the process direction. The rotation of the polygonal mirror 70 and positioning of the mirrors 102a, 104a, 104b, 106a, 106b and lenses 120a, 122a, 122b of the first post-scan optical assembly 100 causes each laser beam first portion 152a, 154a to repeatedly sweep, along a corresponding scan path in the scan direction, across its corresponding photoconductive drum 28Y, 26C so as to write Pels to form a latent image on the drum.

After being reflected by the mirror 70, the third and fourth beams 62a and 64a are reflected by a reflection mirror 102b and pass through a second F-1 lens 120b, see FIGS. 3 and 4. The F-1 lens 120b functions to focus or converge each beam 62a, 64a to a point in the scan direction. The lens 120b may also function to effect a slight reduction in laser beam velocity variation in the scan direction.

A first portion 162a, i.e., a substantial portion, of the third beam 62a and a first portion 164a, i.e., a substantial portion, of the fourth beam 64a pass through the F-1 lens 120b. However, a second portion (not shown), i.e., a small portion, of the third beam 62a and a second portion 264a, i.e., a small portion, of the fourth beam 64a may be reflected by a beam entrance surface or a beam exit surface of the F-1 lens 120b away from the PC drums 22K and 24M, see FIG. 6 where the second portion 264a of the fourth beam 64a is shown reflected back towards the mirror 70.

After passing through the second F-1 lens 120b, the first portion 162a of the third beam 62a is reflected by third beam mirrors 108a and 108b prior to passing through a corresponding third F-2 lens 122c. The first portion 164a of the fourth beam 64a, after passing through the second F-1lens 120b, is reflected by fourth beam mirrors 10a and 10b prior to passing through a corresponding fourth F-2 lens 122d. The third and fourth F-2 lenses 122c and 122d function to complete the convergence of their corresponding beam first portions 162a, 164a along the process direction. The rotation of the polygonal mirror 70 and positioning of the mirrors 102b, 108a, 108b, 110a, 110b and lenses 120b, 122c, 122d of the second post-scan optical assembly 101 causes each laser beam first portion 162a, 164a to repeatedly sweep, along a corresponding scan path in the scan direction, across its corresponding photoconductive drum 22K, 24M so as to write Pels to form a latent image thereon.

Presuming that the polygonal mirror 70 is rotating in a counter-clockwise direction, as viewed in FIG. 2, the first and second beams 52a and 54a are scanned in a first direction indicated by the first directional arrow FD, while the third and fourth laser beams 62a and 64a are scanned in a second direction indicated by the second directional arrow SD.

As noted above, a second portion 252a of the first beam 52a may be reflected in a direction away from PC drum 28Y. As illustrated in FIG. 5, the second portion 252a may pass over the polygonal mirror 70 so as to enter the second post-scan optical assembly 101 such that it defines a "ghosting" beam. The second portion 252a may then be directed by the second post-scan optical assembly 101 to the PC drum 22K such that it discharges the PC drum 22K in areas where data was not intended to be written and/or discharges the drum 22K more, i.e., an additional amount, in areas in which data was intended to be written. In either event, the unintended discharge of the PC drum 22K results in print quality defects being generated in the resulting toner image. While not illustrated in FIG. 5, the second portion 254a of the second beam 54a may also pass into the second post-scan optical assembly 101 such that it may discharge unintended areas of the PC drum 24M. The second portion 252a of the first beam 52a and the second portion 254a of the second beam 54a may pass over, under and/or on either side of the polygonal mirror 70.

Figure 6:
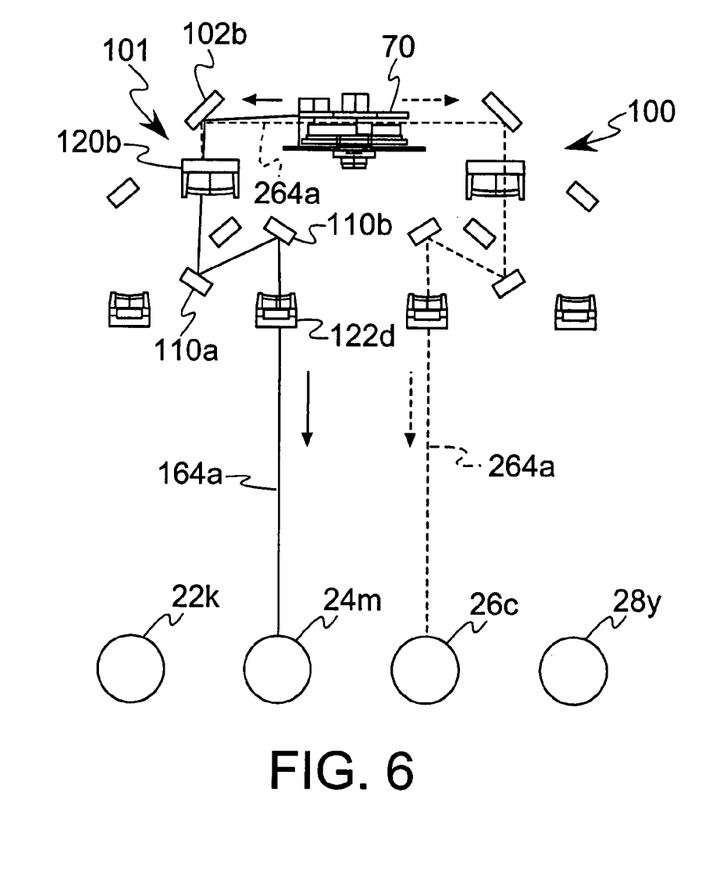
FIG. 6 is a view of the polygonal mirror and the first and second post-scan optical assemblies and illustrating a second portion of a fourth beam being reflected into the first post-scan optical assembly.

As also noted above, the second portion of the third beam 62a and the second portion 264a of the fourth beam 64a may be reflected away from PC drums 22K and 24M. As illustrated in FIG. 6, the second portion 264a of the fourth beam 64a may pass under the polygonal mirror 70 so as to enter the first post-scan optical assembly 100 such that it defines a "ghosting" beam. The second portion 264a may then be directed by the first post-scan optical assembly 100 to the PC drum 26C such that it discharges the drum 26C in areas where data was not intended to be written and/or discharges the drum 26C more in areas in which data was intended to be written. In either event, the unintended discharge of the PC drum 26C, results in print quality defects being generated in the resulting toner image. While not illustrated in FIG. 6, the second portion of the third beam 62a may also pass into the first post-scan optical assembly 100 such that it may discharge unintended areas of the PC drum 28Y. The second portion 264a of the fourth beam 64a and the second portion of the third beam 62a may pass over, under or on either side of the polygonal mirror 70.

So as to prevent the unintended discharge of the PC drums 28Y, 26C, 22K, 24M by the second portions of the first, second, third and fourth beams 52a, 54a, 62a and 64a, a shield 300 is position over the rotating polygonal mirror 70, see FIGS. 7, 7A, 8 and 9A, which functions to block the second portions of the first, second, third and fourth beams 52a, 54a, 62a and 64a. The shield 300 comprises a main body 310 having a side wall 312 and an upper wall 314, which are integral with one another. The side wall 312 and upper wall 314 have a thickness of about 1.25 mm. A generally circular opening 314a is provided in the main body upper wall 314. The inner surfaces of the side wall 312 and upper wall 314 are generally smooth so as to reduce turbulent air noise resulting from rotation of the mirror 70. Extending out from the main body 310 are first, second and third legs 316, 318 and 320, respectively, which are integral with the main body 310. The first, second and third legs 316, 318 and 320 are bolted or otherwise attached the printhead housing 37, see FIG. 7. The shield 300 may be formed from a polymeric material.

Figure 8:
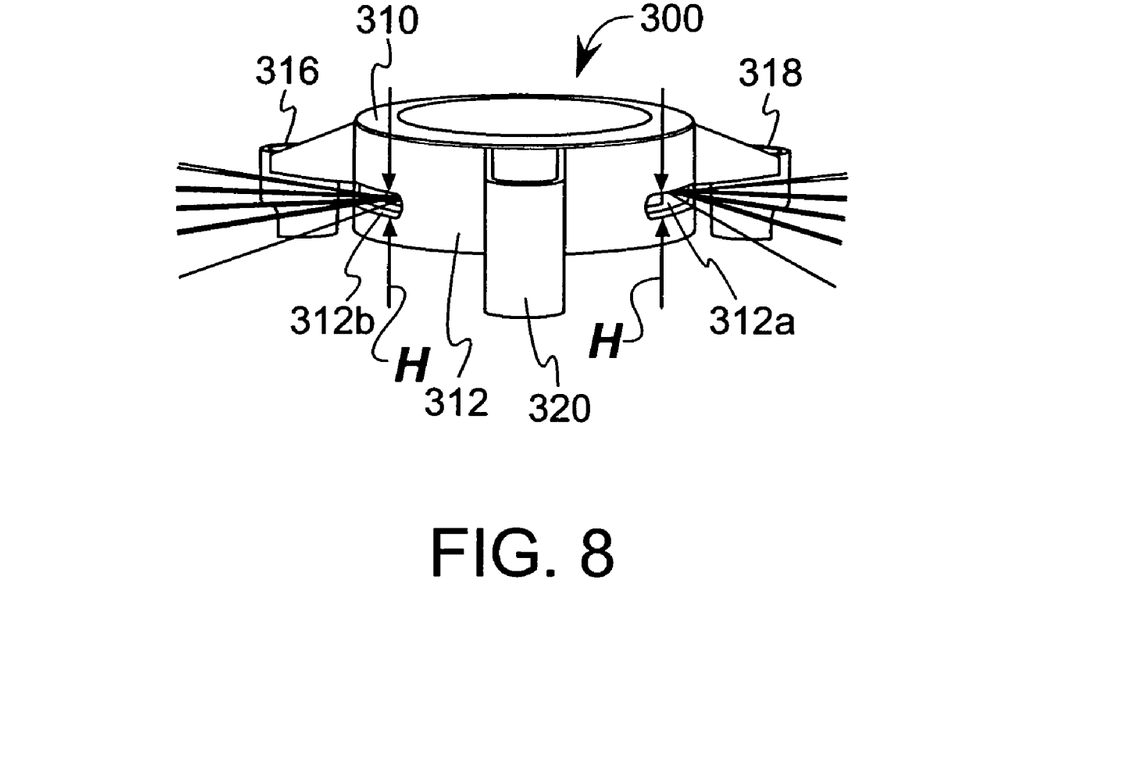
FIG. 8 is a front view of the shield illustrated in FIG. 7.

The main body side wall 312 includes a first slot 312a through which the first and second beams 52a and 54a enter the shield 300 from the first pre-scan assembly 50 and leave the shield 300 after being reflected by the polygonal mirror 70. The main body side wall 312 also includes a second slot 312b through which the third and fourth beams 62a and 64a enter the shield 300 from the second pre-scan assembly 60 and leave the shield 300 after being reflected by the polygonal mirror 70.

Figure 7:
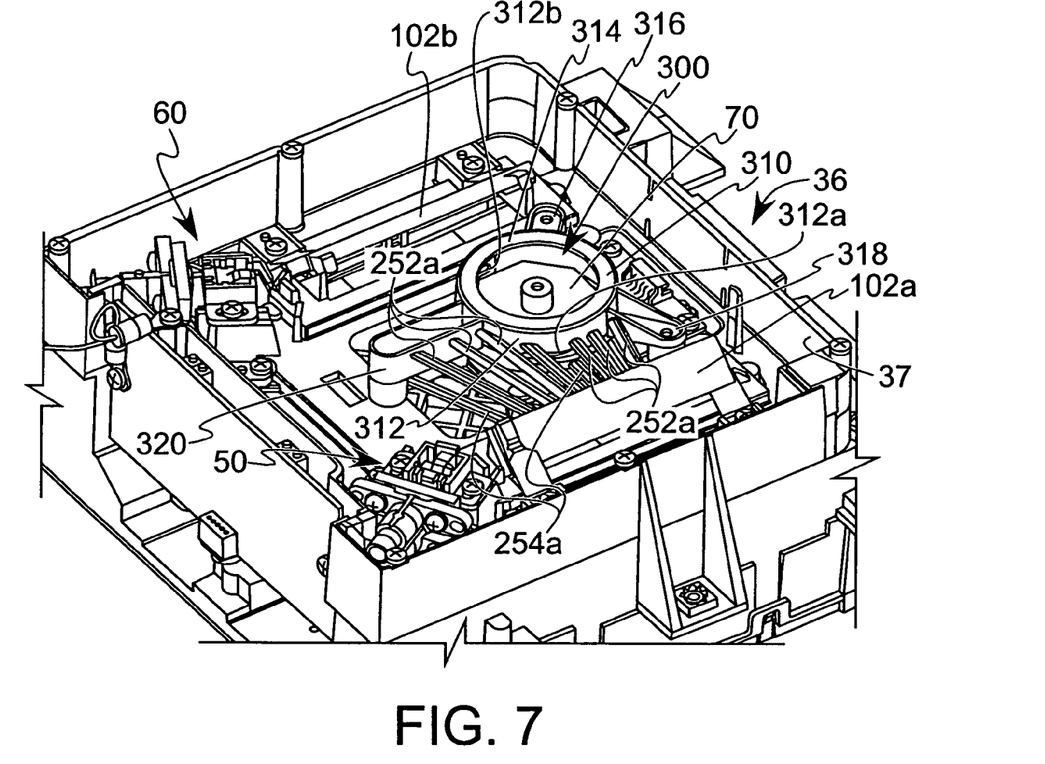
FIG. 7 illustrates the printhead housing of the first embodiment and includes second portions of the first and second beams at seven different positions corresponding to seven different points in time during scans of the first portions of the first and second beams.
Figure 7A:
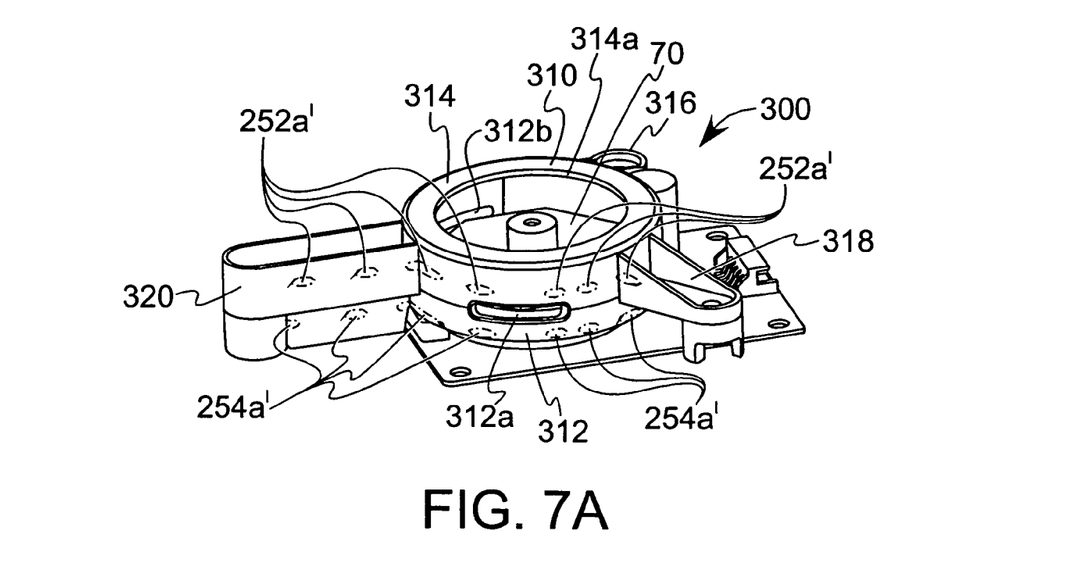
FIG. 7A illustrates seven different locations on the shield where each second portion of the first and second beams strikes the shield.

FIG. 7 illustrates the second portion 252a of the first beam 52a at seven different positions corresponding to seven different points in time during a scan of the first portion 152a of the first beam 52a. FIG. 7A illustrates seven different locations 252a' on the shield 300 where the second portion 252a of the first beam 52a strikes the shield 300 when at the seven positions illustrated in FIG. 7. FIG. 7 also illustrates the second portion 254a of the second beam 54a at seven different positions corresponding to seven different points in time during a scan of the first portion 154a of the second beam 54a. FIG. 7A also illustrates seven different locations 254a' on the shield 300 where the second portion 254a of the second beam 54a strikes the shield 300 when at the seven positions illustrated in FIG. 7. As is apparent from FIGS. 7 and 7A, the shield 300 functions to block the second portion 252a of the first beam 52a from reaching the second post-scan optical assembly 101 during at least a substantial portion of the scan of the first portion 152a of the first beam 52a along the PC drum 28Y as well as to block the second portion 254a of the second beam 54a from reaching the second post-scan optical assembly 101 during at least a substantial portion of the scan of the first portion 154a of the second beam 54a along the PC drum 26C. The shield 300 also functions to block the second portion of the third beam 62a from reaching the first post-scan optical assembly 100 during at least a substantial portion of the scan of the first portion 162a of the third beam 62a along the PC drum 22K as well as to block the second portion 264a of the fourth beam 64a from reaching the first post-scan optical assembly 100 during at least a substantial portion of the scan of the first portion 164a of the fourth beam 64a along the PC drum 24M.

It is possible that the second portions of the first, second, third and fourth beams 52a, 54a, 62a and 64a may be reflected in a direction away from a corresponding PC drum 28Y, 26C, 22K, and 24M by one of the beam entrance or exit surfaces of a corresponding F-2 lens 122a, 122b, 122c and 122d. It is further possible that additional portions of the first, second, third and fourth beams 52a, 54a, 62a and 64a may be reflected in a direction away from the PC drums 28Y, 26C, 22K and 24M by the beam entrance or exit surfaces of the F-1 lenses 120a or 120b or the F-2 lenses 122a-122d. In any event, the shield 300 functions to block most if not all portions of the beams which may be reflected away from the PC drums so as to prevent those beam portions from entering an opposing post-scan optical assembly 100, 101.

Figure 9:
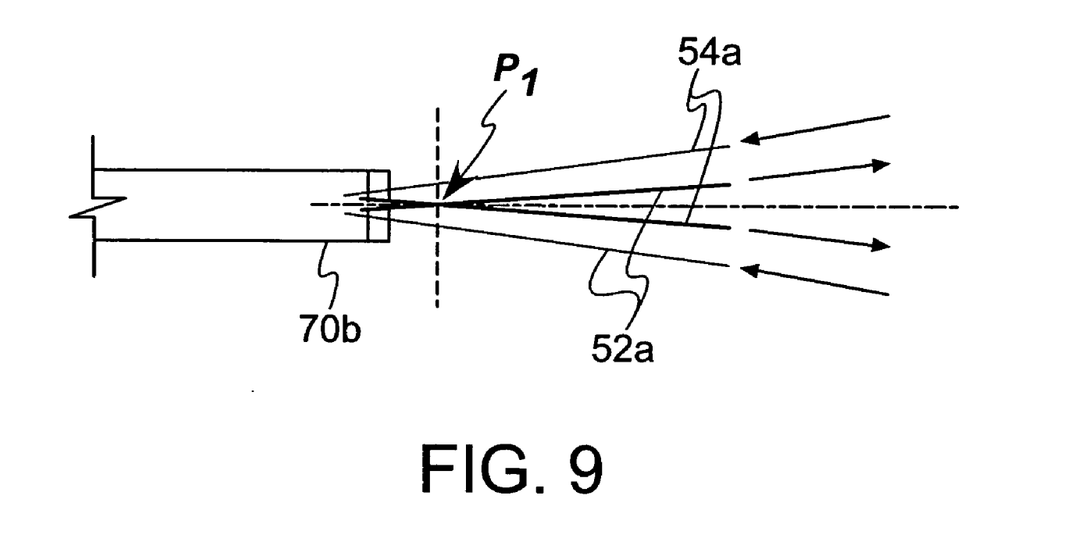
FIG. 9 is a side view of the polygonal mirror and illustrating a crossing point for the first and second laser beams.
Figure 9A:
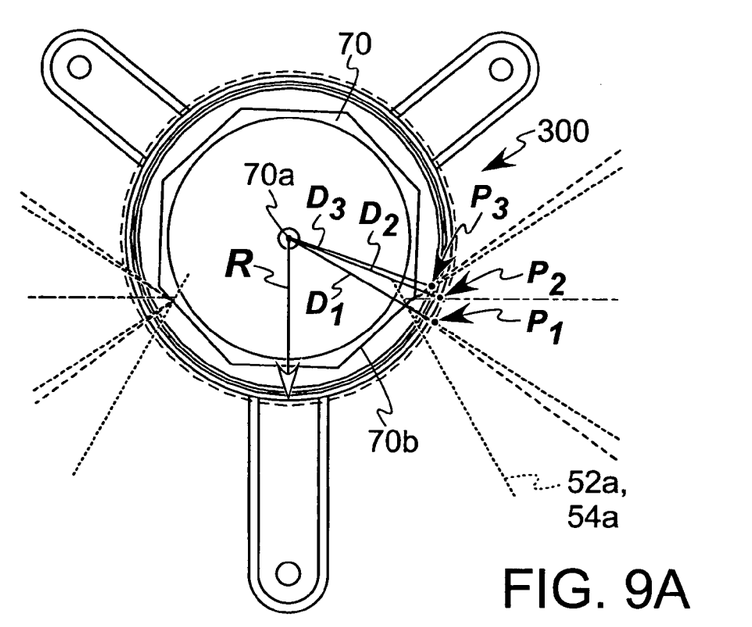
FIG. 9A is a top view of the shield with an upper wall of the shield removed to fully illustrate the polygonal mirror and further illustrating distances from the center axis of the mirror to first and second beam crossing points.
Figure 9B:
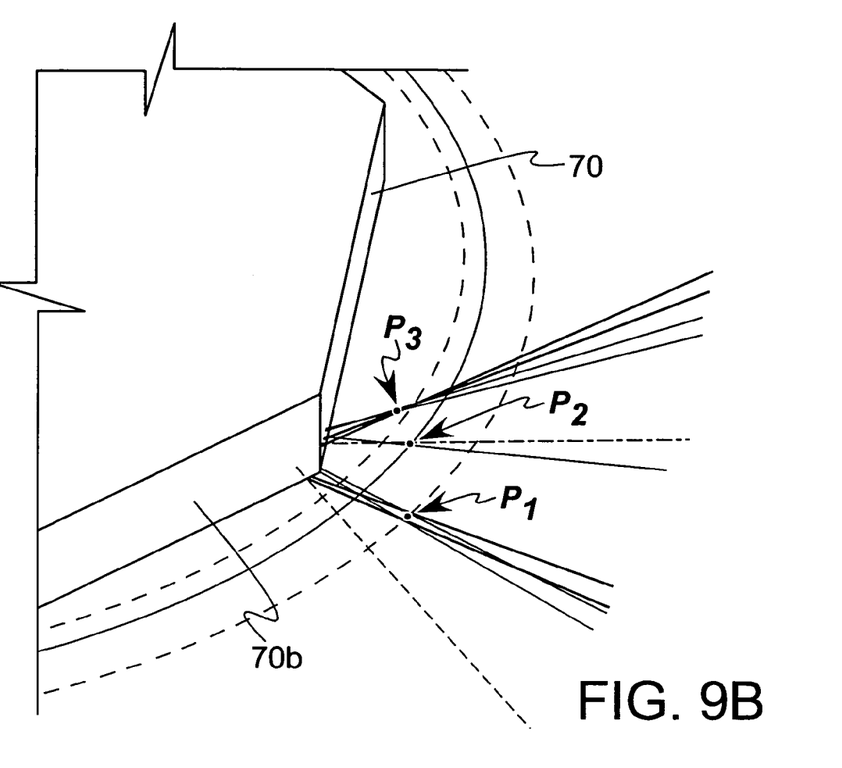
FIG. 9B is an enlarged view of a section of the polygonal mirror and first and second beam crossing points.

As noted above, the pre-scan lens 56a functions to redirect the first and second beams 52a and 54a such that they converge at or near a common spot or location on a common polygonal mirror facet 70b, see FIG. 9. After striking the common facet 70b, the beams 52a and 54a cross at points spaced radially from the polygonal mirror center axis, which is also the rotational axis 70a of the mirror 70. As illustrated in FIGS. 9A and 9B, the first and second beams 52a and 54a cross at a first point $P_1$ located at a distance $D_1$ from the center axis 70a of the mirror 70 at the start of the scan of the first portions 152a and 154a of the first and second beams 52a and 54a; the first and second beams 52a and 54a cross at a second point $P_2$ located at a distance $D_2$ from the center axis 70a of the mirror 70 at a mid-point along the scan of the first portions 152a and 154a of the first and second beams 52a and 54a; and the first and second beams 52a and 54a cross at a third point $P_3$ located at a distance $D_3$ from the center axis 70a at the end of the scan of the first portions 152a and 154a of the first and second beams 52a and 54a. As is apparent from FIG. 9A, $D_1$ is greater than $D_2$ which is greater than $D_3$. It is believed that the height H of each of the first and second slots 312a and 312b in the main body side wall 312 may be minimized while also reducing noise resulting from air turbulence if the main body 310 is configured such that the side wall 312 is located between the distance D1 and distance D3. In the illustrated embodiment, the side wall 312 has a generally cylindrical shape and has an outer radius R from the center axis 70a which falls within the range of between about distance D1 and distance D3. By reducing the height H of the slots 312a and 312b, the light-blocking surface area of the shield side wall 312 may be increased.

Figure 10:
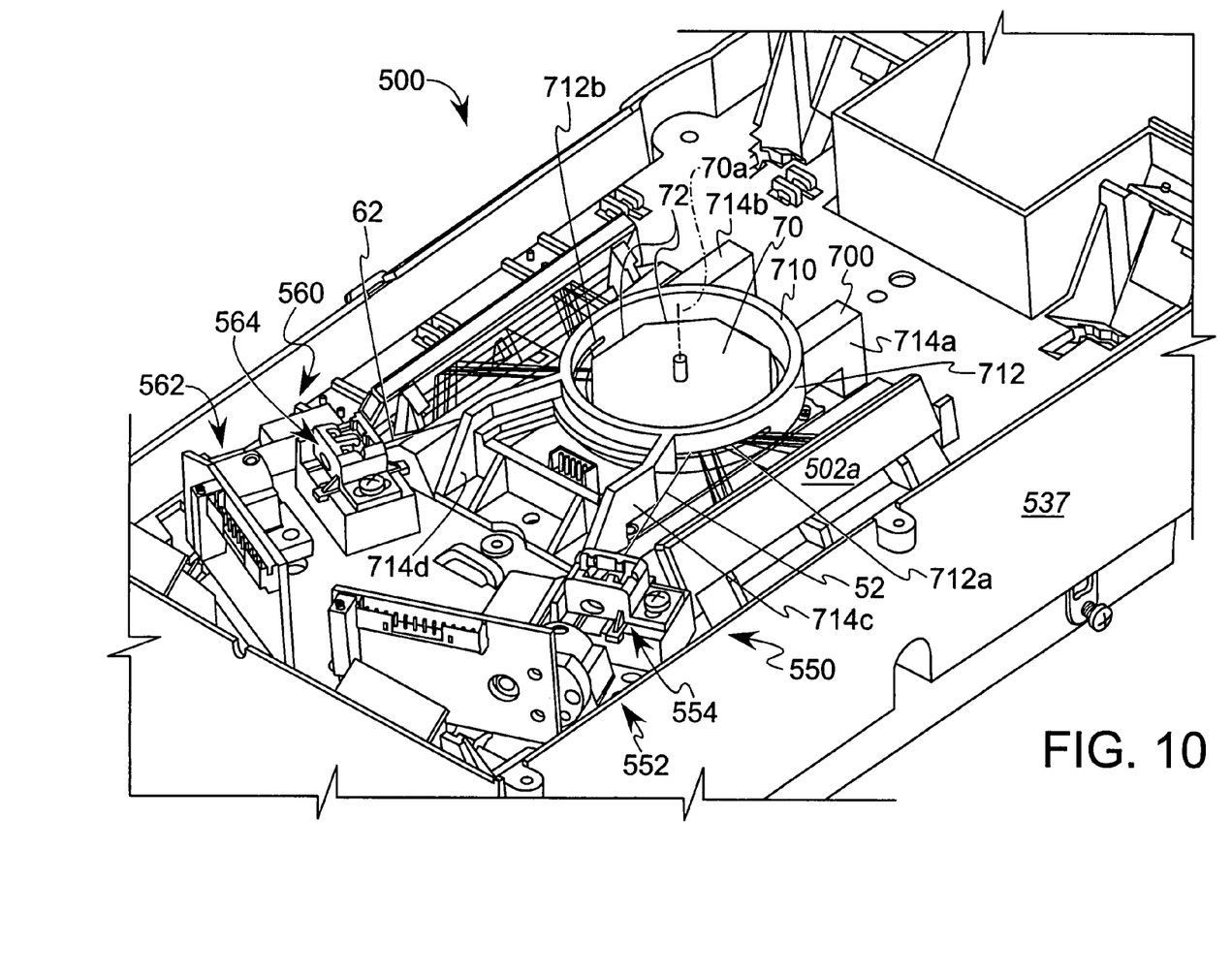
FIG. 10 is a perspective view of a printhead constructed in accordance with a second embodiment of the present invention illustrating a polygonal mirror, first and second pre-scan assemblies and a shield.

A printhead 500 constructed in accordance with a second embodiment of the present invention is illustrated in FIG. 10, where like elements are referenced by like numerals. The printhead 500 comprises a printhead housing 537, which is preferably formed as a molded component. The printhead 500 further includes a single rotatable polygonal mirror 70 and first and second pre-scan optical assemblies 550 and 560. The pre-scan assemblies 550 and 560 are spaced apart from one another by an angle of approximately 44 degrees. The mirror 70 is supported for rotation about a rotational axis 70a, driven by an appropriate motor and comprises a plurality of facets 72.

The first pre-scan assembly 550 comprises a first laser diode/collimator lens unit 552, which generates a first laser beam 52. The first assembly 550 additionally includes a first pre-scan lens assembly 554 for receiving the first beam 52. The second pre-scan assembly 560 comprises a second laser diode/collimator lens unit 562, which generates a second laser beam 62. The second assembly 560 additionally includes a second pre-scan lens assembly 564 for receiving the second beam 62. Each pre-scan lens assembly 554 and 564 includes a pre-scan lens for focusing or converging each beam 52 and 62 in a process direction, which is generally parallel to the rotational axis 70a of the mirror 70, without causing convergence of the beam in a scan direction. The beams 52 and 62 strike a corresponding facet 72 on the mirror 72 at an angle which is substantially perpendicular, i.e., 90 degrees, to a face of the facet 72.

Each of the laser beams 52, 62 is modulated so as to write pixels or Pels according to an associated video signals from a controller (not shown) as the beams 52 and 62 scan along a corresponding scan path.

Figure 11:
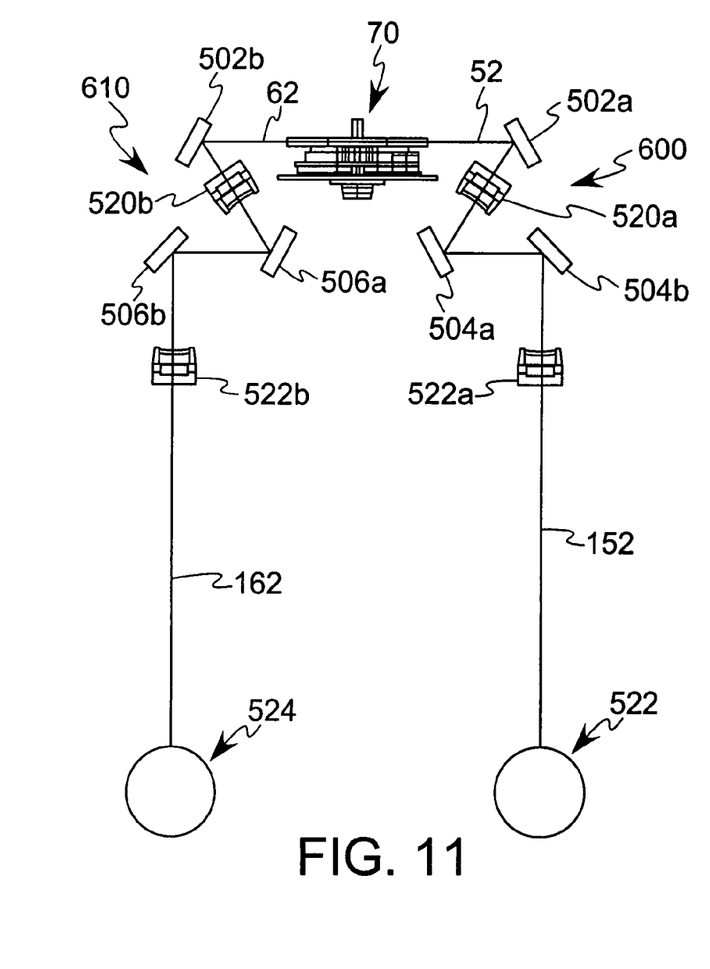
FIG. 11 is a view of the polygonal mirror and the first and second post-scan optical assemblies forming part of the printhead illustrated in FIG. 10.

Each laser beam 52, 62 is reflected off the rotating polygonal mirror 70 and is directed towards a corresponding one of photoconductive drums 522 and 524 by select mirrors and lenses in first and second post-scan optical assemblies 600 and 610, see FIG. 11. More specifically, the first beam 52 passes through the first post-scan optical assembly 600, while the second beam 62 passes through the second post-scan optical assembly 610. The first and second post-scan optical assemblies 600 and 610 are symmetrically positioned about the polygonal mirror rotational axis 70a.

The first beam 52, after being reflected off the rotating polygonal mirror 70, is reflected by a reflection mirror 502a and passes through a first F-1 lens 520a, see FIG. 11. Similarly, the second beam 62, after being reflected off the rotating polygonal mirror 70, is reflected by a reflection mirror 502b and passes through a second F-1 lens 520b. The F-1 lenses 520a and 520b function to focus or converge the beams 52, 62 to a waist in the scan direction. The lenses 520a, 520b may also effect a slight reduction in laser beam velocity variation in the scan direction.

A first portion 152, i.e., a substantial portion, of the first beam 52 and a first portion 162, i.e., a substantial portion, of the second beam 62 pass through the F-1 lenses 520a and 520b. However, a second portion (not shown), i.e., a small portion, of the first beam 52 and a second portion 262, i.e., a small portion, of the second beam 62 may be reflected by one of the beam entrance or exit surfaces of the F-1 lenses 520a, 520b in a direction away from the PC drums 522 and 524, see FIG. 11A where the second portion 262 of the second beam 62 is shown reflected in a direction away from the PC drum 524.

After passing through the first F-1 lens 520a, the first portion 152 of the first beam 52 is reflected by first beam mirrors 504a and 504b prior to passing through a corresponding first F-2 lens 522a. The first portion 162 of the second beam 62, after passing through the second F-1 lens 520b, is reflected by second beam mirrors 506a and 506b prior to passing through a corresponding second F-2 lens 522b. The first and second F-2 lenses 522a and 522b function to complete the convergence of their corresponding beam first portions 152, 162 along the process direction. The rotation of the polygonal mirror 70 and positioning of the mirrors 502a, 504a, 504b, and lenses 520a, 522a of the first post-scan optical assembly 600 causes the first laser beam first portion 152 to repeatedly sweep, along a corresponding scan path in the scan direction, across its corresponding photoconductive drum 522 so as to write Pels to form a latent image on the drum. Also, the rotation of the polygonal mirror 70 and positioning of the mirrors 502b, 506a, 506b, and lenses 520b, 522b of the second post-scan optical assembly 610 causes the second laser beam first portion 162 to repeatedly sweep, along a corresponding scan path in the scan direction, across its corresponding photoconductive drum 524 so as to write Pels to form a latent image on the drum.

Figure 11A:
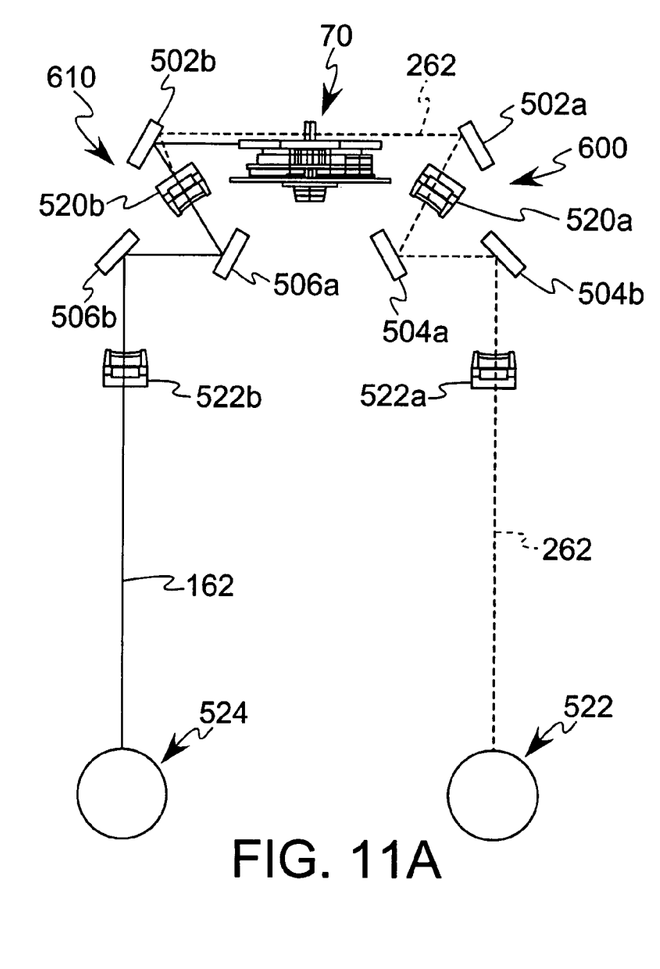
FIG. 11A is a view of the polygonal mirror and the first and second post-scan optical assemblies and illustrating a second portion of a second beam being reflected into the first post-scan optical assembly.

As noted above, the second portion 262 of the second beam 62 may be reflected in a direction away from the PC drum 524. As illustrated in FIG. 11A, the second portion 262 may pass over the polygonal mirror 70 so as to enter the first post-scan optical assembly 600 such that it defines a "ghosting" beam. The second portion 262 may then be directed by the first post-scan optical assembly 600 to the PC drum 522 such that it discharges the PC drum 522 in areas where data was not intended to be written and/or discharges the drum 522 more in areas in which data was intended to be written. In either event, the unintended discharge of the PC drum 522 results in print quality defects being generated in the resulting toner image. While not illustrated in FIG. 11A, the second portion of the first beam 52 may pass into the second post-scan optical assembly 610 such that it may discharge unintended areas of the PC drum 524. The second portion of the first beam 52 and the second portion 262 of the second beam 62 may pass over, under and/or on either side of the polygonal mirror 70.

So as to prevent the unintended discharge of the PC drums 522, 524 by the second portions of the first and second beams 52 and 62, a shield 700 is position over the rotating polygonal mirror 70, see FIG. 10, which functions to block the second portions of the first and second beams 52 and 62. The shield 700 comprises a main body 710 having a side wall 712. Extending out from the main body 710 are first, second, third and fourth legs 714a-714d, respectively, which are integral with the main body 710. The first, second, third and fourth legs 714a-714d are bolted or otherwise attached the printhead housing 537. The shield 700 may be formed from a polymeric material.

The main body side wall 712 includes first and second slots 712a and 712b through which the first and second beams 52 and 62 enter the shield 700 from the first and second pre-scan assemblies 550 and 560 and leave the shield 700 after being reflected by the polygonal mirror 70.

The shield 700 functions to block the second portion of the first beam 52 from reaching the first post-scan optical assembly 610 during a substantial portion of the scan of the first portion 152 of the first beam 52 along the PC drum 522 as well as to block the second portion 262 of the second beam 62 from reaching the first post-scan optical assembly 600 during a substantial portion of the scan of the first portion 162 of the second beam 62 along the PC drum 524.

What is claimed is:
1. A laser scanning unit comprising:
a housing;
a scanning device;
a first pre-scan assembly generating a first light beam and directing said first light beam toward said scanning device;
a second pre-scan assembly generating a second light beam and directing said second light beam toward said scanning device;
a first post-scan assembly receiving said first light beam reflected from said scanning device and causing a first portion of said first light beam to scan along a first scan path;
a second post-scan assembly receiving said second light beam reflected from said scanning device and causing a first portion of said second light beam to scan along a second scan path;
said first post-scan assembly further reflecting a second portion of said first light beam in a direction away from said first scan path; and
a shield associated with said housing for blocking said second portion of said first light beam reflected by said first post-scan assembly during at least a portion of the scan of said first portion of said first light beam along the first scan path so as to prevent said second portion of said first light beam from entering said second post-scan assembly during said at least a portion of said scan of said first portion of said first light beam.

2. A laser scanning unit as set forth in claim 1, where said shield comprises a main body and at least one leg portion, said main body being fitted over said scanning device.

3. A laser scanning unit as set forth in claim 2, wherein said at least one leg portion comprises at least two leg portions.

4. A laser scanning unit as set forth in claim 2, wherein said main body comprises a first slot through which said first beam passes and a second slot through which said second beam passes.

5. A laser scanning unit as set forth in claim 2, wherein said main body has a substantially smooth interior surface so as to reduce turbulent air noise.

6. A laser scanning unit as set forth in claim 1, wherein said scanning device comprises a rotating polygonal mirror having at least one facet, said first pre-scan assembly directing said first light beam toward said at least one facet at a substantially right angle.

7. A laser scanning unit as set forth in claim 1, wherein said scanning device comprises a rotating polygonal mirror having at least one facet, said first pre-scan assembly directing said first light beam toward said at least one facet at an oblique angle.

8. A laser scanning unit as set forth in claim 1, wherein said first and second pre-scan lens assemblies are separated from one another by an angle of about 60 degrees.

9. A laser scanning unit comprising:
a housing;
a rotating polygonal mirror having a center axis and a plurality of facets;
a pre-scan assembly generating first and second light beams and directing said first and second light beams toward a common facet on said polygonal mirror such that each of said first and second light beams strikes said common facet at an oblique angle, said beams being reflected by said common facet and crossing one another at points spaced radially from said polygonal mirror center axis;
a first post-scan assembly receiving said reflected first beam and causing a first portion of said first beam to scan along a first scan path, said first post-scan assembly further reflecting a second portion of said first beam in a direction away from said first scan path;
a second post-scan assembly receiving said reflected second beam and causing a first portion of said second beam to scan along a second scan path, and
a shield associated with said housing for blocking said second portion of said first beam reflected by said first post-scan assembly post-scan assembly during at least a portion of the scan of said first portion of said first light beam along the first scan path, said shield having a main body provided with a side wall including a slot through which said first and second beams pass prior to and after striking said common facet, said main body side wall being located so as to be substantially near at least one of said crossing points of said first and second beams.

10. A laser scanning unit as set forth in claim 9, where said shield further comprises at least one leg portion, and said main body being fitted over said scanning device.

11. A laser scanning unit as set forth in claim 10, wherein said at least one leg portion comprises at least two leg portions.

12. A laser scanning unit as set forth in claim 9, wherein said main body has a substantially smooth interior surface so as to reduce turbulent air noise.

13. A laser scanning unit as set forth in claim 9, wherein said first and second beams strike said common facet at oblique angles in a plane substantially perpendicular to a rotational plane of said polygonal mirror.

14. A laser scanning unit as set forth in claim 9, wherein said main body side wall is located between a crossing point nearest to said polygonal mirror center axis and a crossing point furthest from said polygonal mirror center axis.

15. A laser scanning unit comprising:
   a housing;
   a scanning device;
   a first pre-scan assembly generating first and second light beams and directing said first and second light beams toward said scanning device;
   a second pre-scan assembly generating third and fourth light beams and directing said third and fourth light beams toward said scanning device;
   a first post-scan assembly receiving said first and second beams reflected from said scanning device and causing a first portion of said first beam to scan along a first scan path and a first portion of said second beam to scan along a second scan path;
   a second post-scan assembly receiving said third and fourth beams reflected from said scanning device and causing a first portion of said third beam to scan along a third scan path and a first portion of said fourth beam to scan along a fourth scan path;
   said first post-scan assembly further reflecting a second portion of said first beam in a direction away from said first scan path;
   said second post-scan assembly further reflecting a second portion of said third beam in a direction away from said third scan path; and
   a shield associated with said housing for blocking said second portion of said first beam reflected by said first post-scan assembly during at least a portion of the scan of said first portion of said first light beam along the first scan path and further blocking said third beam second portion reflected by said second post-scan assembly during at least a portion of the scan of said first portion of said third light beam along the third scan path.

16. A laser scanning unit as set forth in claim 15 where said shield comprises a main body and at least one leg portion, said main body being fitted over said scanning device.

17. A laser scanning unit as set forth in claim 16, wherein said main body comprises a first slot through which said first and second beams pass and a second slot through which said third and fourth beams pass.

18. A laser scanning unit as set forth in claim 15, wherein said scanning device comprises a rotating polygonal mirror having at least one facet, said first pre-scan assembly directing each of said first and second light beams toward said at least one facet at an oblique angle.

19. A laser scanning unit as set forth in claim 15, wherein said first and second pre-scan lens assemblies are separated from one another by an angle of about 60 degrees.

20. A laser scanning unit as set forth in claim 15, wherein said first and second post-scan assemblies are symmetrically positioned about said scanning device.

* * * * *